June 10, 1947. E. DI IANNI Re. 22,888

GARMENT FASTENING DEVICE

Original Filed Nov. 17, 1944

INVENTOR
EMANUEL DI IANNI
BY Barr, Borden & Fox
ATTORNEYS

Reissued June 10, 1947

Re. 22,888

UNITED STATES PATENT OFFICE 22,888

GARMENT FASTENING DEVICE

Emanuel Di Ianni, Norristown, Pa.

Original No. 2,407,969, dated September 17, 1946, Serial No. 563,869, November 17, 1944. Application for reissue February 21, 1947, Serial No. 729,901

3 Claims. (Cl. 2—234)

This invention relates to garment fastening devices for opening and closing of garments for personal wear.

The object of the invention is to provide improved means of the zipper fastener type, for controlling the said opening and closing of garments for personal wear; such as men's trousers or the like, women's garments, such as slacks, riding breeches, sports wear, skirts, or the like, and for children's garments.

As especial feature of the invention is the simplified construction that is easy to operate and which will maintain the garments securely smooth and without wrinkles.

An outstanding improvement being the carrying the zipper elements, or stringers entirely across the waist band or to the top margin of the garment, thereby doing away with the use of buttons or other fastening devices such as hooks, or snap fasteners.

The invention also includes providing protective coverings of the zipper element to prevent undesirable contact with adjacent surfaces or parts.

The invention also comprises improved protective coverings associated with and concealing said stringers and to spread out smoothly in mutually abutting alined relation upon closing the zipper.

In some cases the arrangement is such that the covering may be pulled in opposite directions above and below the desired area.

Referring to the drawing, which illustrates merely by example, suitable means for the embodiment of my invention:

All of the figures are on the same scale, except

Figure 1:
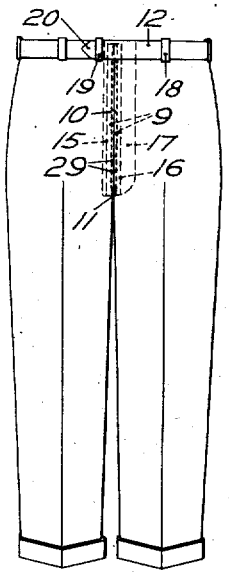
Fig. 1 is a front elevation of men's trousers; the parts being shown in closed position.
Figure 2:
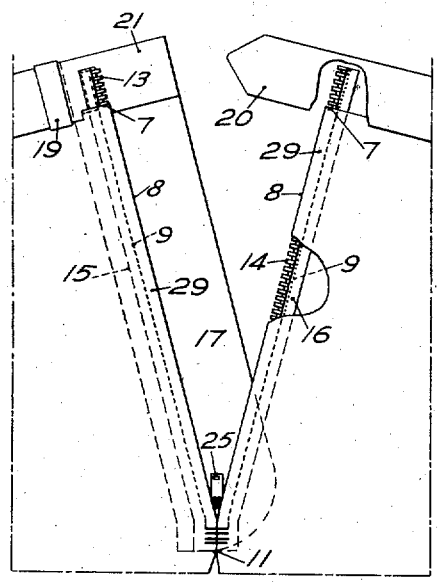
Fig. 2 is a fragmentary front elevation, the parts being shown in open position, and partially broken away to show the relation of one flap and its associated zipper locking element.
Figure 3:
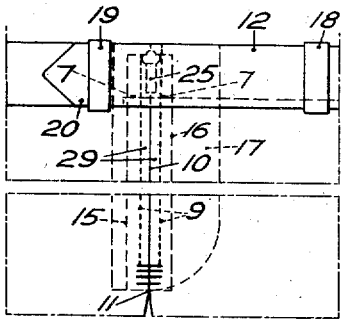
Fig. 3 is a fragmentary enlarged view of the front elevation of Fig. 1, the parts being shown in closed position.
Figure 7:
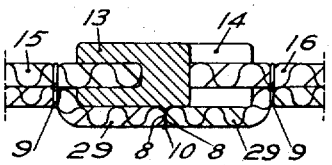
Fig. 7 is a fragmentary transverse section on an exaggerated scale through the closing and locking parts of the opening, taken on line 7—7 of Fig. 5.

Fig. 1, which is upon a smaller scale, and Fig. 7 which for clarity is upon an exaggerated scale.

Similar numerals refer to similar parts throughout the several views.

The zipper elements, when closed, extend from the crotch 11 close to the top of the waist band 12.

In the absence of the waist band or belt, the zipper will extend to the top margin of the garment.

The zipper on all figures comprises locking elements 13 and 14, associated with supporting stringers 15 and 16, in the usual way, and the stringers are secured to the fabric of the garment adjacent to the free edges 8 thereof at the garment opening, by lines of stitches or the like 9, disposed laterally immediately adjacent to the inner edges of the respective locking elements, and thus defining zipper-overlapping flexible flaps 29. The line of stitches 9 is spaced inwardly of the locking elements by a distance not appreciably greater than the thickness of the lateral guide flanges 30 of the conventional slide element 25, and just far enough to permit free sliding motion of the locking slide element 25. The flaps 29 terminate laterally in the free edges 8 and extend vertically from the lower end of the opening vertically to terminations 7 just above the lower edge of the belt, and delineate the closure opening in the exterior of the garment. The flaps 29 are so disposed that when the locking elements are in the mutually interlocked closing position, the free edges 8 of the respective juxtaposed flaps 29 are brought into and held in close mutually abutting engagement in a median line 10 with the flaps lying in a substantially or general plane parallel to and superposed upon the general plane of the interlocked zipper elements, so as to render the locked zipper practically invisible from the lower end of the opening to and across the lower edge of the belt of the garment.

A tab is also secured to the garment so as to form an undercovering or protection to the zipper when closed.

One or more loops, such as 18 and 19, are associated with the waist band, and a tab or projection 20 extends from one end of the waist band and engaging with the loop such as 19.

The other end of the belt 12 is preferably provided with a stiffening part 21, which may be of double thickness of the fabric. This reinforcing piece 21 stiffens tab 17 and contributes to maintain the parts smooth or prevent wrinkling.

This reinforcing piece 21 forms a body thicker than that of the main part of the fabric.

The upper part of the zipper or stringer is brought up over the reinforcing part close to the top edge of the garment.

When locked in closed position, the upper end of the zipper will extend to, and be flush with, a point just below said top edge of the garment.

The locking element or slide 25 will be entirely concealed and firmly held in locked position until released in the usual way while lying in a space above the upper edges 7 of the flaps 29 and between overlapping tabs to decrease wrinkles and enhance smoothness, and with the zipper taking all of the tensile stress of the belt.

Figure 5:
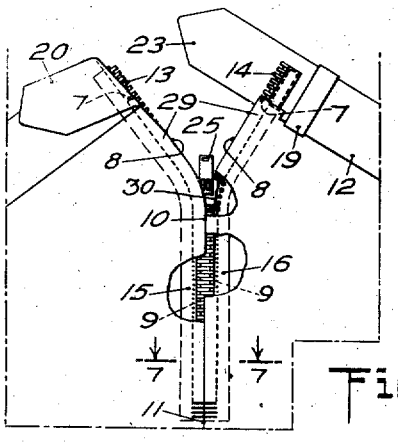
Fig. 5 is a fragmentary front elevation of a similar arrangement especially adapted for women's wear, partially broken away to show the relation of the closing and locking parts.
Figure 4:
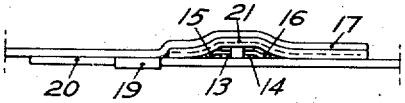
Fig. 4 is a fragmentary top view of the arrangement shown in Fig. 3.
Figure 6:
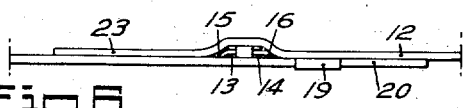
Fig. 6 is a top view of the parts shown in Fig. 5.

In Figs. 5 and 6, I show a similar device for women's wear, in which, in addition to the outer stiffened tab or flap 20, a similar tab or flap 23 is provided for an under covering. This flap or tab 23, as is the tab 20 is of the same width as the belt 12, and the said flaps 20 and 23 extend in opposite directions stitched to the garment on opposite sides of the zipper as effective extensions of the belt 12, thus forming embracing covers for the locking end of the zipper part which extends across the waist band, or over the garment close to the top edge thereof.

The parts as above stated, are locked in closed position by the locking slide 25.

This arrangement of under and over covering, is especially adapted for garments worn by women.

Having thus described my invention, I claim:

1. A garment fastening device for the upper edge portion of a garment whereby smoothness and freedom from wrinkles are substantially attained, comprising the combination of a nether garment having an elongated substantially vertical opening and an attached belt forming the upper edge of said garment, said belt being peripherally effectively of greater extent than such garment and terminating at each end in free tabs arranged for overlapping relation in closing said opening, said opening being delineated in part at least by flexible flaps formed of the material of the garment each extending vertically from the lower end of the opening to termination vertically above and close to the lower edge of said belt peripherally spaced from the tab ends, two slide fastener parts including stringers seamed respectively inwardly of and behind the respective flaps and of a length such as to extend from the bottom of said opening upwardly across the upper terminations of the respective flaps to termination vertically below the upper edge of said belt and peripherally spaced from the respective tab ends, a locking slide for said parts arranged when in locked relation to be disposed vertically between the upper terminations of the flaps and the upper edge of the belt and transversely between the overlapping tabs, said belt and slide fastener parts so arranged that when the latter are locked the tabs conceal the locking element and adjacent portions of the slide fastener parts above the lower edge of the belt while the flaps conceal the slide fastener parts from a point just inside of the lower edge of the belt to the bottom of the opening, while the entire tensile strain of the belt is taken by said locked slide fasteners in the peripheral line of the belt.

2. A garment fastening for the upper edge portion of a garment to minimize wrinkles and maintain smoothness in the fastened garment, comprising in combination a garment having a substantially vertical opening and an attached belt of greater peripheral extent than said garment adjacent to the belt, said opening externally of the garment below the belt formed by free edges of the material joined at the bottom of the opening, complemental slide fastener parts including stringers secured respectively to the material adjacent and respectively parallel to the respective free edges of the opening and thereby forming external flexible flaps which are laterally substantially coextensive with the said respective slide fastener parts, said belt having a portion in vertical alignment with each flap, said flaps having an upper termination above the lower edge of the belt, said slide fastener parts extending from the lower end of said opening upwardly across the upper terminal ends of said flaps to terminate adjacent to the upper edge of said belt, said flaps and parts being so arranged that when the parts are brought into interlocked relation the flaps are brought into substantially abutting relation to conceal the locked zipper from the lower end of the opening to a line above the lower edge of said belt, said belt terminating in a tab extension arranged to overlap externally and to conceal the flaps and parts above the lower edge of the belt, and means for causing locking and unlocking of the parts.

3. A garment having an opening delineated in the outer surface of the garment by flexible flaps having edges, a zipper closure formed of complemental components each formed of stringers and locking elements, each of the flaps being superimposed over one of the stringers and locking elements so that the edges of the respective flaps and of the associated locking elements are transversely substantially aligned, a slide element for the respective zipper components arranged to move vertically longitudinally thereof, said respective stringers being secured to the respective flaps by a line of attachment spaced from the locking elements by a distance which is not appreciably greater than the thickness of a side guide flange of a slide element in parallel spaced relation to the free edges of the flaps with a clearance between said line and locking elements, substantially only such as to permit free movement of the slide element in locking and unlocking sliding movements on the zipper components, the arrangement of flaps and zipper components being such that when the zipper components are brought into mutually interlocking relation the flaps are brought into substantially abutting alinement and they form a visual substantial continuation of the material of the garment concealing the locked zipper.

EMANUEL DI IANNI.

REFERENCES CITED

The following references are of record in the file of this patent:

UNITED STATES PATENTS

| Number | Name | Date |
|---|---|---|
| 1,860,433 | Rosenbaum | May 31, 1932 |
| 2,059,337 | Goldsmith | Nov. 3, 1936 |
| 2,277,832 | Rhoads | Mar. 31, 1942 |

FOREIGN PATENTS

| Number | Country | Date |
|---|---|---|
| 414,538 | Great Britain | Aug. 9, 1934 |